INVENTOR.
ALLEN G. FORD

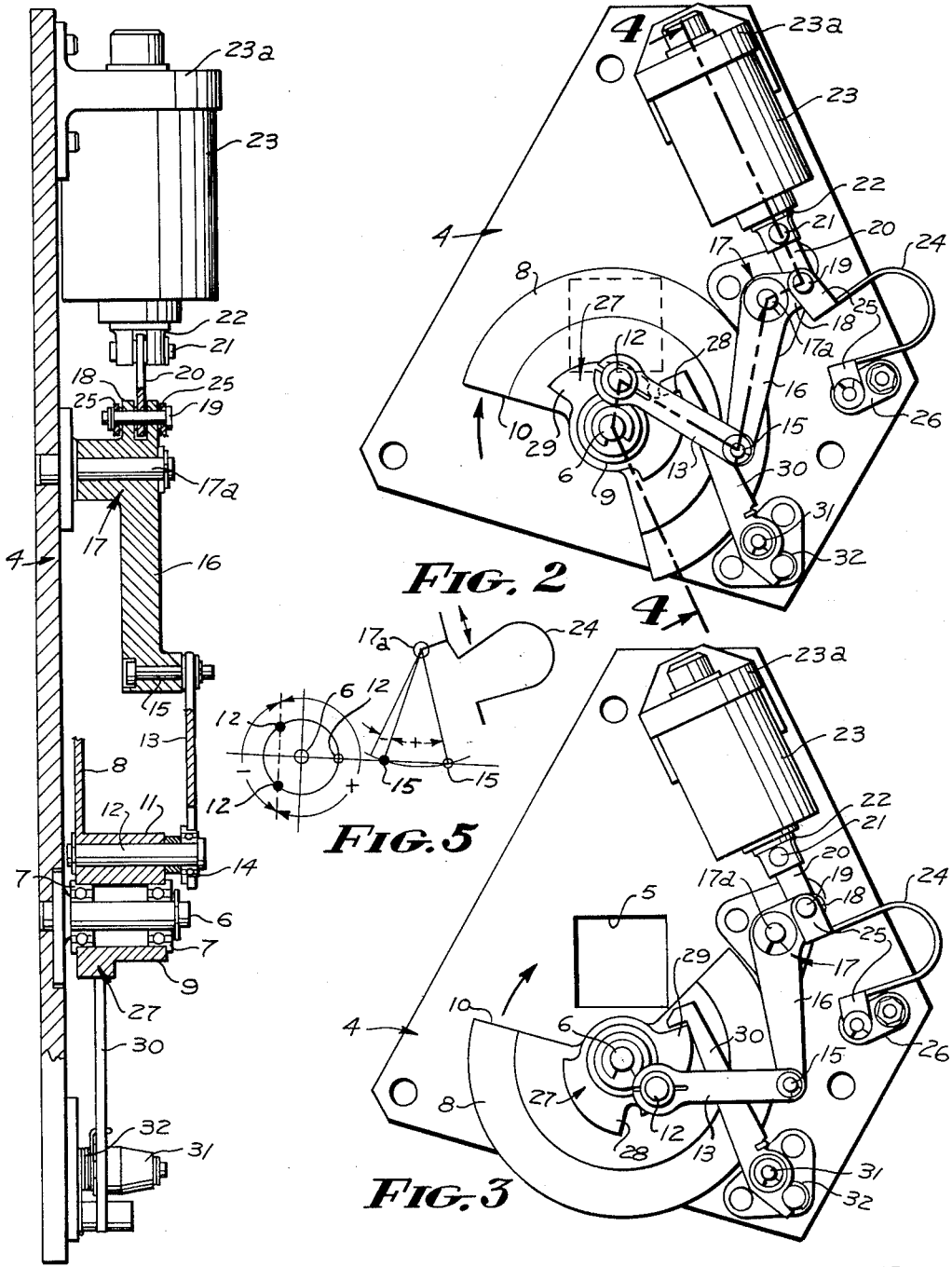

United States Patent Office 3,217,624
Patented Nov. 16, 1965

3,217,624
ELECTRICALLY-OPERATED ROTARY SHUTTER
James E. Webb, administrator of the National Aeronautics and Space Administration, with respect to an invention of Allen G. Ford
Filed May 14, 1963, Ser. No. 280,776
3 Claims. (Cl. 95—58)

This invention relates to electrically-operated rotary shutters, and more particularly to a camera shutter for a television camera aboard a spacecraft.

It has been found in planetary and lunar exploration that television cameras carried aboard spacecrafts, such as the Mariner and Ranger, have various exposure times required of the camera shutter because of the variation of the planetary brightness or the vidicon sensitivity and no absolute value could be assigned to these factors. In order to accommodate the uncertainty of these factors, the requirement is placed on the shutter design so that the exposure time can be varied across the rather broad range around nominal exposure time of 100 msec. for a long focal length camera and 40 msec. for a short focal length camera.

The two techniques available for controlling the length of the exposure time are: (1) the adjustment of a spring tension; and, (2) electronic pulse commands to a solenoid to control the camera shutter action. It has been found that the latter technique gives a more reliable control of exposure time for space flight conditions.

In order to simplify the electronic logics and interfaces of the other camera components to the shutter, a further requirement was placed upon the shutter design that the complete exposure cycle require only a single electrical pulse, the exposure time being determined by the pulse width of a telemetered signal or a signal generated on board the spacecraft.

The simplest approach for the purpose of achieving an electronically-controlled shutter is a flag-type focal plane shutter in which a solenoid in response to a pulse operates a single blade shutter through a very simple linkage to move the blade in a clockwise direction to expose the vidicon tube to the lunar or planetary image and then upon command from the Earth or within the spacecraft the pulse is turned off and a biasing spring returns the flag-type shutter blade in a counter-clockwise position to the closed position. It has been found that such a flag-type shutter has an inherent uneven exposure across the field of view of the vidicon tube due to the fact that during the opening cycle the blade is traveling in a direction opposite to that which it travels during the closing cycle. This results in one side of the field being exposed to $T_o + T_c$ seconds longer than the other side where $T_o$ is the transit time of the shutter blade edge across the field of view during the opening cycle and $T_c$ is the transit cycle of the shutter blade edge during the closing cycle. Also, high speed photography requires shutter operation of such short duration that the shutter would bounce and therefore this is another inherent defect in the flag-type shutter.

The rotary blade shutter of the present invention substantially reduces the effect of the shutter bounce during the high speed photography requirements and at the same time provides an even exposure across the field of view. This is accomplished by using a solenoid responsive to an electrical pulsed signal, to move the shutter blade through a suitable linkage to an open position and maintain it in the open position for the prescribed length of exposure time. Upon termination of the pulsed signal a U-shaped spring acts on the shutter blade through the same linkage to rotate the shutter in the same clockwise movement to its closed position.

Thus the upper limit to the exposure time of the rotary blade shutter is the length of time the solenoid can be energized without overheating the windings, which is greatly in excess of the exposure time requirements, while the lower limit is determined by the inertia of the shutter moving parts. Furthermore, with this rotary blade type of shutter the maximum difference in exposure across the field of the vidicon tube is equal to $T_o - T_c$ rather than $T_o + T_c$ as in the case of the flag-type shutter. This eases considerably the problem of obtaining uniform exposures.

An object of the invention, therefore, is to provide an electrically-operated rotary shutter which is particularly adapted for remote control operation and especially for use on space vehicles, so that the shutter may be automatically operated by controls carried by the spacecraft or by signals sent from a ground station.

A further object of the invention is to provide an electrically-operated rotary shutter which is in a normally closed position, and moved by a solenoid, on command, to an open position and held in this open position for an accurate predetermined rate, and then closed by spring action.

And, a still further object of the invention is to provide a rotary shutter of this type wherein the operating time of the solenoid and the spring may be matched so as to minimize the variation in exposure time across the shutter aperture.

With the above and other objects in view, as may appear hereinafter, reference is directed to the accompanying drawings in which:

FIGURE 2 is an enlarged, elevational view of the shutter and the plate on which it is mounted, showing the shutter in its closed position;

FIGURE 3 is a similar plan view showing the shutter in its open position;

FIGURE 4 is a sectional view taken through 4—4 of FIGURE 2, that is, through the pivotal axes of the shutter drive mechanism;

FIGURE 5 is a diagrammatical view illustrating the action of the spring which controls rotation of the shutter.

Figure 1:
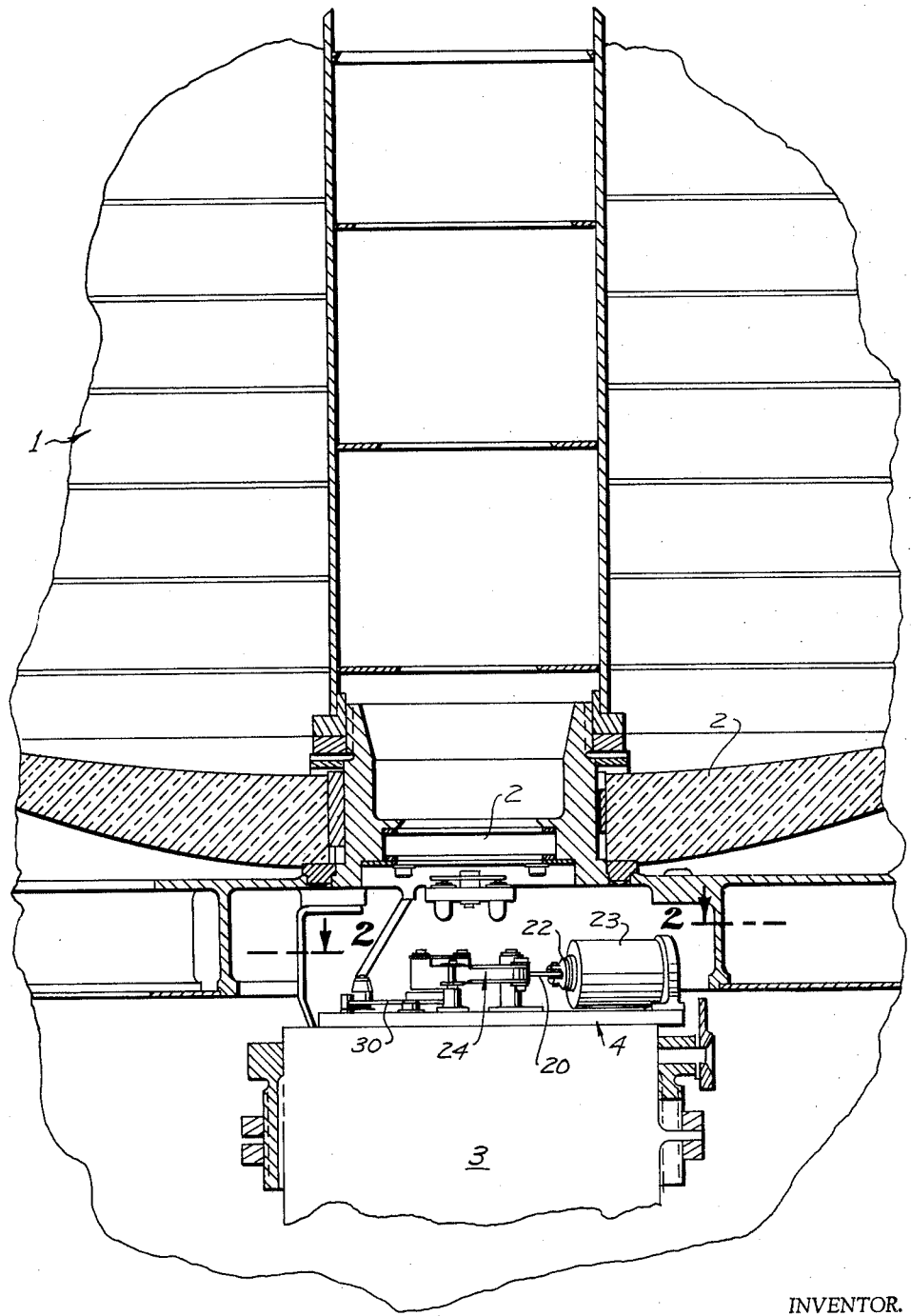
FIGURE 1 is a fragmentary view of a vidicon camera, incorporating the electrically-operated rotary shutter.

The electrically-operated rotary shutter is particularly adapted for use with a vidicon camera 1 installed on a space vehicle. The vidicon camera illustrated fragmentarily in FIGURE 1 includes a lens system 2 which focuses an image on a sensitive element, not shown, of a camera structure 3.

Interposed between the lens system and the camera structure 3 is a base plate 4 having a square aperture 5 therein. A post 6 is disposed at one side of the aperture 5 and is provided with bearings 7 which support a shutter disk 8 by means of a central hub 9. The shutter disk 8 is circular except for a notched segment forming a shutter gate 10.

At one side of the hub 9 is an eccentric boss 11 which carries a crank pin 12. The crank pin is joined to a connecting rod 13 through a bearing 14. The extended end of the connecting rod 13 is joined by a pivot 15 to the major arm 16 of a crank lever 17. The crank lever 17 is journaled on a fixed shaft 17a projecting outwardly from the base plate 4. The crank lever 17 includes a minor arm 18 joined by a journal pin 19 to a link 20, which in turn is connected by a pin 21 to one end of a solenoid armature 22.

The solenoid armature 22 is adapted to reciprocate within a solenoid casing 23 having therein a solenoid coil, not shown. The solenoid casing is secured to the base plate 4 by a bracket 23a. Connected to the journal pin 19 is a U-shaped spring 24 having pairs of out-turned lugs 25 at its extremity, one of which is connected with the journal pin 19, and the other of which is connected to an adjustable anchor bracket 26 secured to the base plate 4 in such a manner as to be rotated in order to adjust the force of the U-shaped spring 24.

Formed integrally with the shutter disk 8 is a ratchet 27 having two stop shoulders 28 and 29. These shoulders are engaged in succession by a catch lever 30 supported by a pivot 31 and urged toward the ratchet 27 by a spring 32.

Operation of the electrically-operated rotary shutter is as follows:

When the solenoid is de-energized, the U-shaped spring 24 pulls outwardly on the armature 22 and exerts a force through the crank lever 17 and connecting rod 13, tending to cause a counterclockwise rotation of the shutter disk 8. This movement is prevented by the catch lever 30 engaging the stop shoulder 28.

When the solenoid is activated, the armature 22 is drawn into the solenoid and exerts a force tending to rotate the shutter disk 8 in a clockwise direction until the stop shoulder 29 passes the catch lever 30. That is, movement of the armature 22 shifts the shutter disk 8 in a clockwise direction from the closed position shown in FIGURE 2 to the open position shown in FIGURE 3.

The shutter disk 8 remains in its open position for the length of time that current is applied to the solenoid. By accurate control of the duration of the electrical pulse applied to the solenoid, the exposure time may be accurately controlled.

When the solenoid is de-energized, after movement of the shutter disk 8 to the position shown in FIGURE 3, the U-shaped spring 24 exerts a clockwise rotation to the shutter disk 8. Sufficient energy is stored in the shutter disk 8 that the shutter disk not only moves to its closed position covering the aperture 5, but also continues to travel until the catch lever 30 again engages the stop 28. That is, the energy supplied by the U-shaped spring 24 is utilized to return the shutter disk 8 from the position shown in FIGURE 3 to the position shown in FIGURE 2.

Reference is directed to FIGURE 5. The spring 24 is so adjusted that it passes through a relaxed or neutral position when the pin 12 passes through the black dot positions thereof, and a dead-center condition occurs at the circle dot position of the pin 12. Thus, in the position shown in FIGURE 2, the force of the spring is counterclockwise on the pin 12. The solenoid forces the spring past the dead-center position to that shown in FIGURE 3 so that the force of the spring is now clockwise on the pin 12. The instant the solenoid is de-energized the spring 24 turns the shutter disk 8 clockwise, and stores sufficient energy to carry the pin past the black dot portions shown in FIGURE 5 and to the latched position shown in FIGURE 2.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. (a) An electrically-operated rotary shutter, comprising:
   (b) a means having a shutter aperture therein;
   (c) a rotatable shutter disk having a shutter gate positioned to pass said aperture;
   (d) a reciprocable armature;
   (e) a solenoid for urging said armature in one direction;
   (f) a spring for urging said armature in the opposite direction;
   (g) a link and lever means connecting said armature to said shutter disk to effect partial rotation upon operation of said solenoid to bring said gate in registry with said aperture, and to effect continuing rotation upon operation of said spring to move said gate out of registry with said aperture.

2. (a) An electrically-operated rotary shutter, comprising:
   (b) a means having a shutter aperture therein;
   (c) a rotatable shutter disk having a shutter gate positioned to pass said aperture;
   (d) remotely controlled means for partially rotating said shutter disk from an initial position closing said aperture to a second position wherein said gate is in registry with said aperture;
   (e) yieldable means operable on release of said remotely controlled means for continuing rotation of said shutter disk from said second position to said initial position;
   (f) a ratchet carried by said shutter disk having shoulders corresponding to the initial and second positions of said shutter disk;
   (g) and catch means engageable with said shoulders to secure said shutter disk against counter-rotation from said positions.

3. (a) An electrically-operated rotary shutter, comprising:
   (b) a means having a shutter aperture therein;
   (c) a rotatable shutter disk having a shutter gate positioned to pass said aperture;
   (d) a crank pin on said shutter disk for effecting rotation thereof;
   (e) link and lever means for driving said crank pin;
   (f) remotely controlled means for moving said link and lever means to effect partial rotation of said shutter disk from an initial position, closing said aperture, to a second position, exposing said aperture;
   (g) yieldable means operable on release of said remotely controlled means for moving said link and lever means to effect continued rotation of said shutter disk from said second position to said initial position;
   (h) a ratchet carried by said shutter disk having shoulders corresponding to the initial and second positions of said shutter disk;
   (i) and catch means engageable with said shoulders to secure said shutter disk against counter-rotation from said positions.

References Cited by the Examiner

UNITED STATES PATENTS

| | | | |
|---|---|---|---|
| 2,788,704 | 4/1957 | Habig | 95—59 X |
| 3,093,047 | 6/1963 | Neff | 95—59 |

JOHN M. HORAN, *Primary Examiner.*